(12) United States Patent
Abe et al.

(10) Patent No.: US 11,442,242 B2
(45) Date of Patent: Sep. 13, 2022

(54) VIBRATION WAVE MOTOR AND LENS DRIVING DEVICE

(71) Applicant: CANON KABUSHIKI KAISHA, Tokyo (JP)

(72) Inventors: Ryo Abe, Funabashi (JP); Makoto Oikawa, Yokohama (JP); Yasufumi Yamamoto, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 547 days.

(21) Appl. No.: 16/590,682

(22) Filed: Oct. 2, 2019

(65) Prior Publication Data

US 2020/0110244 A1 Apr. 9, 2020

(30) Foreign Application Priority Data

Oct. 3, 2018 (JP) .............................. JP2018-188042

(51) Int. Cl.
*G02B 7/10* (2021.01)
*H02N 2/00* (2006.01)
*G03B 17/42* (2021.01)

(52) U.S. Cl.
CPC ............. *G02B 7/102* (2013.01); *H02N 2/001* (2013.01); *H02N 2/006* (2013.01); *G03B 17/425* (2013.01); *G03B 2205/0053* (2013.01)

(58) Field of Classification Search
CPC ...... G02B 7/102; G02B 7/1805; G02B 7/005; G02B 7/00; G02B 7/04; G03B 17/425; G03B 2205/0053; G03B 2205/0061; H02N 2/001; H02N 2/006; H02N 2/0055; H02N 2/026; H02N 2/0065
See application file for complete search history.

(56) References Cited

U.S. PATENT DOCUMENTS

2015/0137663 A1* 5/2015 Kimura ................ H02N 2/0055
310/323.02

FOREIGN PATENT DOCUMENTS

JP 2017-022957 A 1/2017

\* cited by examiner

*Primary Examiner* — Emily P Pham
(74) *Attorney, Agent, or Firm* — Cowan, Liebowitz & Latman, P.C.

(57) ABSTRACT

Provided is a vibration wave motor including: a vibrator; a friction member; a pressurizing mechanism; a first holding mechanism; and a second holding mechanism, wherein the vibrator and the friction member are configured to perform relative movement with respect to each other, wherein the first holding mechanism includes a first holding portion and a second holding portion which is longer than the first holding portion in a direction of the relative movement, wherein the friction member is arranged between the first holding portion and the second holding portion, wherein the first holding portion includes a first restriction portion, wherein the second holding portion includes a second restriction portion, and wherein the first restriction portion and the second restriction portion are brought into abutment against the second holding mechanism to restrict movement in directions other than the direction of the relative movement of the vibrator and the first holding mechanism.

7 Claims, 10 Drawing Sheets

VIBRATION WAVE MOTOR AND LENS DRIVING DEVICE

BACKGROUND OF THE INVENTION

Field of the Invention

The present disclosure relates to a vibration wave motor, and to a lens driving device configured to drive a lens through use of a vibration wave motor.

Description of the Related Art

In order to correct focus deviation of an image formed on an imaging plane through an optical system, a digital camera includes a lens driving device configured to perform focusing by moving the entirety or a part of an optical system in accordance with the focus deviation. In recent years, for the purpose of improving speed, accuracy, and quietness of the focusing operation, a lens driving device including a vibration wave motor serving as a drive source attracts attention. In particular, a linear vibration wave motor capable of driving a driven object in a straight direction is excellent in controllability and drive characteristic, and is used as a drive source for a lens driving device. In Japanese Patent Application Laid-Open No. 2017-22957, for the purpose of preventing dropping of rolling members included in a guide mechanism of a vibration wave motor, there is proposed a linear vibration wave motor in which restriction portions configured to restrict movement of a movable portion are provided to a guide member.

SUMMARY OF THE INVENTION

However, in Japanese Patent Application Laid-Open No. 2017-22957, it is preferred that the restriction portions be arranged so as to cover a movement range of the rolling members as much as possible. Thus, there is a problem in that the movable portion is elongated in a proceeding direction in order to appropriately arrange the rolling members, which results in increase in size of the vibration wave motor.

The present disclosure has an object to provide a vibration wave motor capable of being significantly downsized while preventing rolling members from dropping off.

In order to solve problem described above, according to the present disclosure, there is provided a vibration wave motor including: a vibrator; a friction member held in friction contact with the vibrator; a pressurizing mechanism configured to pressurize the vibrator against the friction member; a first holding mechanism configured to hold the vibrator; and a second holding mechanism configured to hold the friction member, wherein the vibrator and the friction member are configured to perform relative movement with respect to each other, wherein the first holding mechanism includes a first holding portion and a second holding portion which is longer than the first holding portion in a direction of the relative movement, wherein the friction member is arranged between the first holding portion and the second holding portion, wherein the first holding portion includes a first restriction portion, wherein the second holding portion includes a second restriction portion, and wherein the first restriction portion and the second restriction portion are brought into abutment against the second holding mechanism to restrict movement in directions other than the direction of the relative movement of the vibrator and the first holding mechanism.

The vibration wave motor capable of being significantly downsized while preventing rolling members from dropping off can be provided.

Further features of the present disclosure will become apparent from the following description of exemplary embodiments with reference to the attached drawings.

DESCRIPTION OF THE EMBODIMENTS

First Example

Preferred embodiments of the present disclosure will now be described in detail in accordance with the accompanying drawings.

Figure 1A:
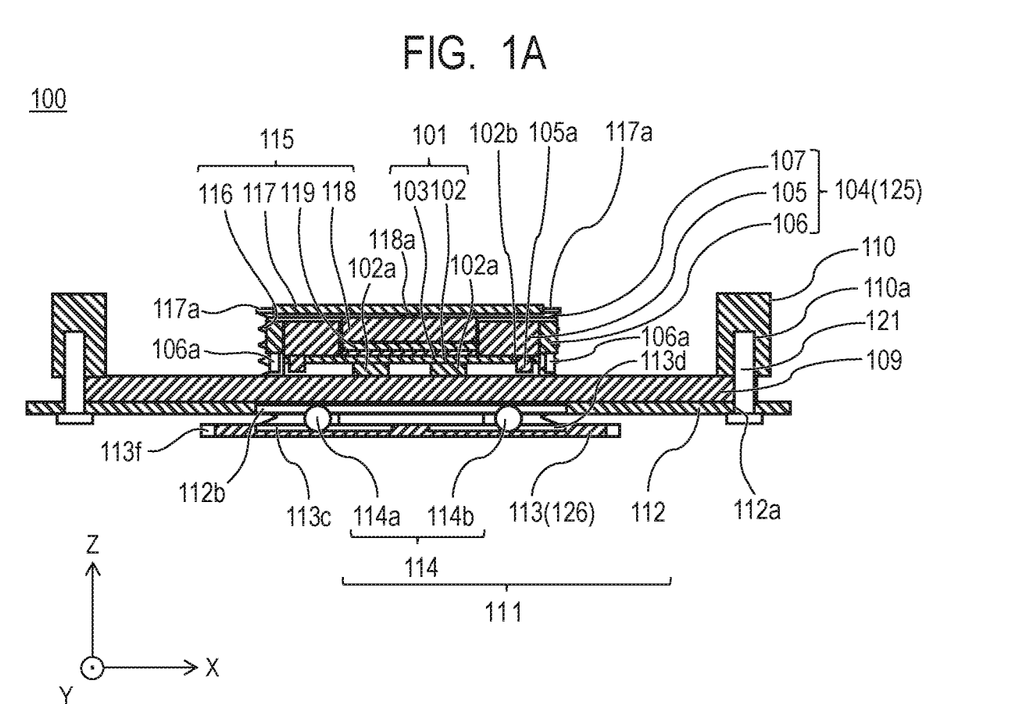
FIG. 1A and FIG. 1B are each a sectional view for illustrating a configuration of a vibration wave motor (100) according to a first embodiment of the present disclosure.
Figure 1B:
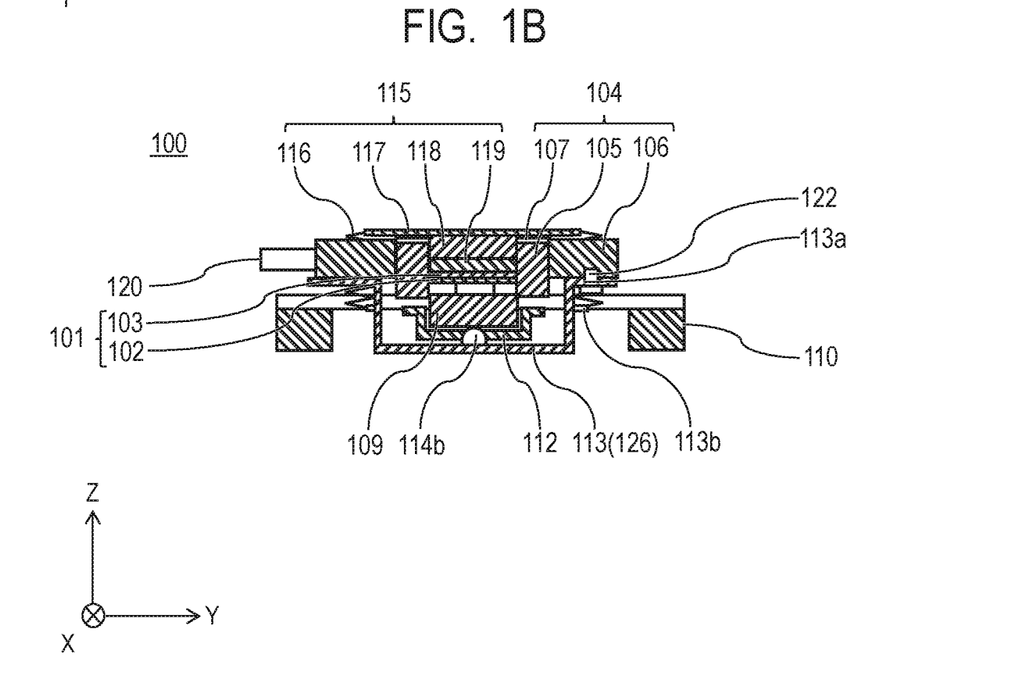

A configuration of a vibration wave motor 100 according to a first embodiment of the present disclosure is described with reference to FIG. 1A and FIG. 1B. FIG. 1A is a sectional view for illustrating the vibration wave motor 100 as viewed from a direction Y orthogonal to a relative movement direction X and a pressurizing direction Z. FIG. 1B is a sectional view for illustrating the vibration wave motor 100 as viewed from the relative movement direction X.

The vibration wave motor 100 is an ultrasonic motor in which a vibrator 101 and a friction member 109 perform relative movement with respect to each other. The vibration wave motor 100 includes the vibrator 101, a vibrator holding casing 104, the friction member 109, a friction-member holding casing 110, a guide mechanism 111, a pressurizing mechanism 115, and a coupling member 120.

The vibrator 101 includes a vibrating plate 102 and a piezoelectric element 103 bonded to each other. As illustrated in FIG. 1A, the vibrating plate 102 includes two protrusions 102a and engagement portions 102b. The two protrusions 102a are provided apart from each other in a longitudinal direction of the vibrating plate 102. The engagement portions 102b are configured to fix the vibrating plate 102 to a first vibrator holding casing 105. Further, a flexible substrate (not shown) (power-feeding member) is electrically connected to the piezoelectric element 103, and high-frequency voltage having a certain amplitude and phase difference is applied from the power-feeding member to the piezoelectric element 103. Then, the vibrator 101 vibrates (ultrasonic vibration with a frequency in an ultrasonic range) to thereby cause each of the protrusions 102a to perform an elliptic motion.

The vibrator holding casing 104 includes the first vibrator holding casing 105, a second vibrator holding casing 106, and a thin plate 107, and forms a mechanism configured to hold the vibrator 101. The first vibrator holding casing 105 includes protrusions 105a, which are engaged with the engagement portions 102b of the vibrator 101 to hold the vibrator 101. The second vibrator holding casing 106 is configured to hold a second guide member 113 described later and the coupling member 120. Further, the second vibrator holding casing 106 includes first restriction portions 106a, which are brought into abutment against the friction member 109 when the vibrator holding casing 104 tilts at a predetermined angle θ with respect to the friction-member holding casing 110. The thin plate 107 is a member having characteristic and elasticity with low stiffness in the pressurizing direction Z and high stiffness in the relative movement direction X and the direction Y, and is configured to couple the first vibrator holding casing 105 and the second vibrator holding casing 106 to each other. With this configuration, even when a state of abutment between the vibrator 101 and the friction member 109 varies depending on component accuracies of the members, the variation is absorbed through deformation of the thin plate 107. As a result, a stable state of abutment is maintained, thereby being capable of generating a thrust force with high efficiency.

The friction member 109 is a member which is held in friction contact with the vibrator 101, and is fastened by fixing members 121 to the friction-member holding casing 110. When voltage is applied to the vibrator 101, and the protrusions 102a each perform the elliptic motion, a friction force is intermittently generated between the friction member 109 and the protrusions 102a. Accordingly, the friction force is formed into a thrust force in the relative movement direction X (proceeding direction) in which the vibrator 101 performs relative movement with respect to the friction member 109. This thrust force allows the vibrator holding casing 104 to perform relative movement with respect to the friction-member holding casing 110.

The friction-member holding casing 110 is a member configured to hold the friction member 109 and a first guide member 112 described later, and is a substantially plate-shaped member fixed to a fastened portion (not shown) (lens barrel 1 described later). The friction-member holding casing 110 has fastening holes 110a, and the fixing members 121 are fastened to the fastening holes 110a so as to hold the friction member 109 and the first guide member 112.

The guide mechanism 111 is a mechanism configured to allow the vibrator 101 to perform relative movement with respect to the friction member 109, and includes guide members and rolling members 114. Further, the guide members include the first guide member 112 and the second guide member 113, and the rolling members 114 include a first rolling member 114a and a second rolling member 114b.

The first guide member 112 is a member which is held on the friction-member holding casing 110 and does not perform relative movement with respect to the friction member 109. The first guide member 112 has the fastening holes 112a and a V-groove 112b, and is fastened to the friction-member holding casing 110 by the fixing members 121 through the fastening holes 112a. Further, the first guide member 112 is held in abutment against the first rolling member 114a and the second rolling member 114b through the V-groove 112b.

The second guide member 113 has fastening holes 113a, and is fastened by fixing members 122 such as screws to the second vibrator holding casing 106, thereby moving integrally with the vibrator holding casing 104. That is, the second guide member 113 is a member which is held on the vibrator holding casing 104 and is configured to move together with the vibrator 101 relative to the friction member 109. Further, the second guide member 113 includes engagement portions 113b engaged with the pressurizing mechanism 115 described later, and is urged in the pressurizing direction Z of the pressurizing mechanism 115. Further, the second guide member 113 has V-grooves 113c and 113d, which are brought into abutment against the first rolling member 114a and the second rolling member 114b, respectively. Further, the second guide member 113 includes second restriction portions 113f, which are brought into abutment against the first guide member 112 when the vibrator holding casing 104 tilts at the predetermined angle θ with respect to the friction-member holding casing 110. However, the second restriction portions 113f are not limited to structures. Also when the second guide member 113 has regions to be brought into abutment against the first guide member 112, the second guide member 113 is regarded as including second restriction portions 113f. Further, the second restriction portions 113f are arranged in a region wider in the relative movement direction X than a region in which the first rolling member 114a and the second rolling member 114b are arranged. One of the features of the present disclosure is that the second guide member 113 is longer than the vibrator holding casing 104 in the relative movement direction X.

The first rolling member 114a and the second rolling member 114b are each a spherical member. The first rolling member 114a is sandwiched between the V-groove 112b of the first guide member 112 and the V-groove 113c of the second guide member 113, and the second rolling member 114b is sandwiched between the V-groove 112b of the first guide member 112 and the V-groove 113d of the second guide member 113. With this configuration, the first rolling member 114a and the second rolling member 114b are restricted by the first guide member 112 so as to move only in the relative movement direction X, and the second guide member 113 is also similarly restricted so as to move only in the relative movement direction X. Further, the rolling of the rolling members 114 allows the second guide member 113 to move with low friction. With the configuration described above, the second guide member 113 is guided in the relative movement direction X with respect to the first guide member 112, and hence the vibrator holding casing 104 is guided in the relative movement direction X with respect to the friction-member holding casing 110.

The pressurizing mechanism 115 is a pressurizing portion which includes elastic members 116, a first transmission member 117, a second transmission member 118, and a third transmission member 119 and is configured to pressurize the vibrator 101 against the friction member 109. The elastic members 116 are springs configured to generate a pressurizing force for holding the vibrator 101 in friction contact with the friction member 109. In the first embodiment, four elastic members 116 are arranged. The number of the elastic members 116 is not limited to four. The first transmission member 117 is a member, which includes engagement portions 117a configured to hold the elastic members 116, and is configured to transmit a pressurizing force to the second transmission member 118. The elastic members 116 have one ends hooked on engagement portions 117a of the first transmission member 117 and another ends hooked on engagement portions 113b of the second guide member 113. With this, the first transmission member 117 and the second guide member 113 are pressurized so as to approach each other. The second transmission member 118 includes an arc portion 118a held in abutment against the first transmission member 117, and is configured to transmit the pressurizing force to the third transmission member 119. With the arc portion 118a held in abutment against the first transmission member 117, the pressurizing force can be transmitted with high efficiency even when the orientation of abutment varies depending on manufacture variation. The third transmission member 119 is a member having elasticity which easily absorbs vibration, and is arranged so as to be sandwiched between the vibrator 101 and the second transmission member 118 and prevents propagation of vibration from the vibrator 101 to another member. The first transmission member 117, the second transmission member 118, the third transmission member 119, the vibrator 101, the friction member 109, the first guide member 112, the first rolling member 114a, the second rolling member 114b, and the second guide member 113 are stacked and pressurized in the Z direction. With the configuration described above, the pressurizing force of the elastic members 116 is transmitted with high efficiency via the first transmission member 117, the second transmission member 118, and the third transmission member 119, thereby holding the vibrator 101 in friction contact with the friction member 109.

The coupling member 120 is a member held on the second vibrator holding casing 106, and is a member configured to transmit a thrust force generated by the vibrator 101 and the friction member 109 to a driven member (lens holding member 8 described later).

With the configuration described above, in the vibration wave motor 100, the thrust force is generated between the vibrator 101 and the friction member 109 by voltage applied through the power-feeding member (not shown), thereby causing the vibrator holding casing 104 configured to hold the vibrator 101 to perform relative movement with respect to the friction-member holding casing 110. Further, the thrust force is transmitted to a driven member via the coupling member 120, thereby driving the driven member in the relative movement direction X.

Figure 2A:
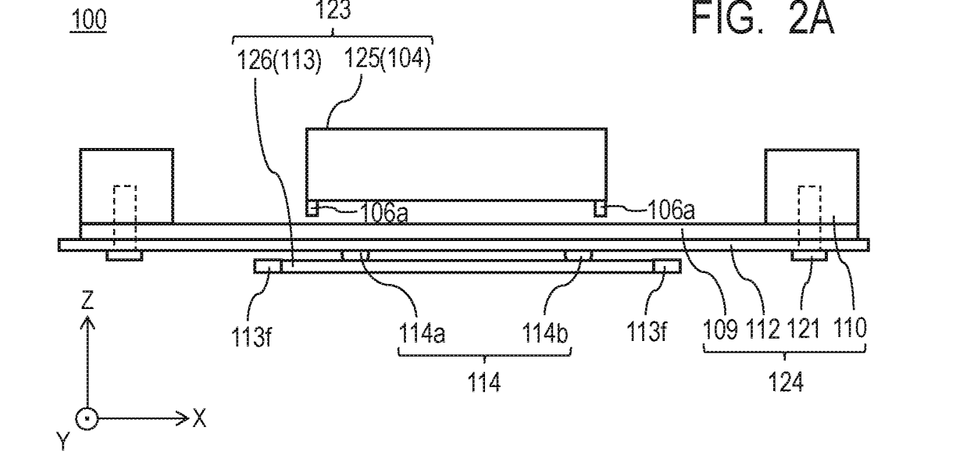
FIG. 2A and FIG. 2B are each a schematic view for illustrating a tilt restriction structure of the vibration wave motor (100) according to the first embodiment.
Figure 2B:
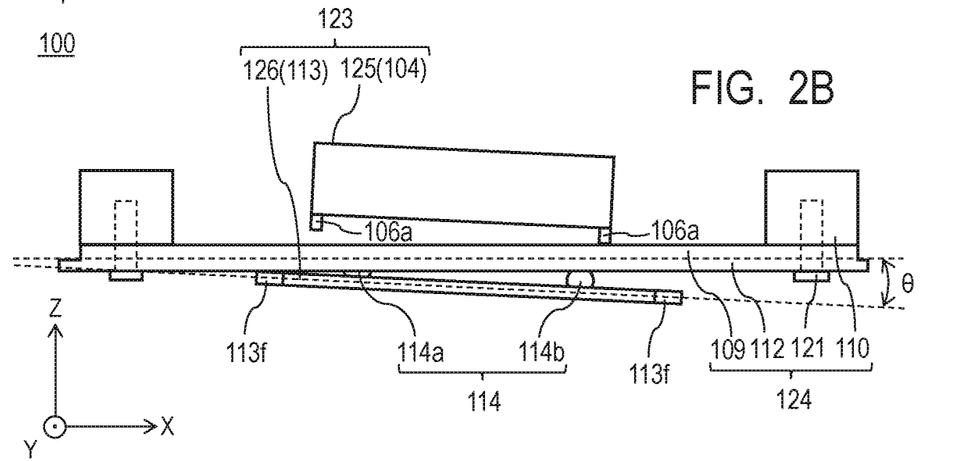
Figure 2C:
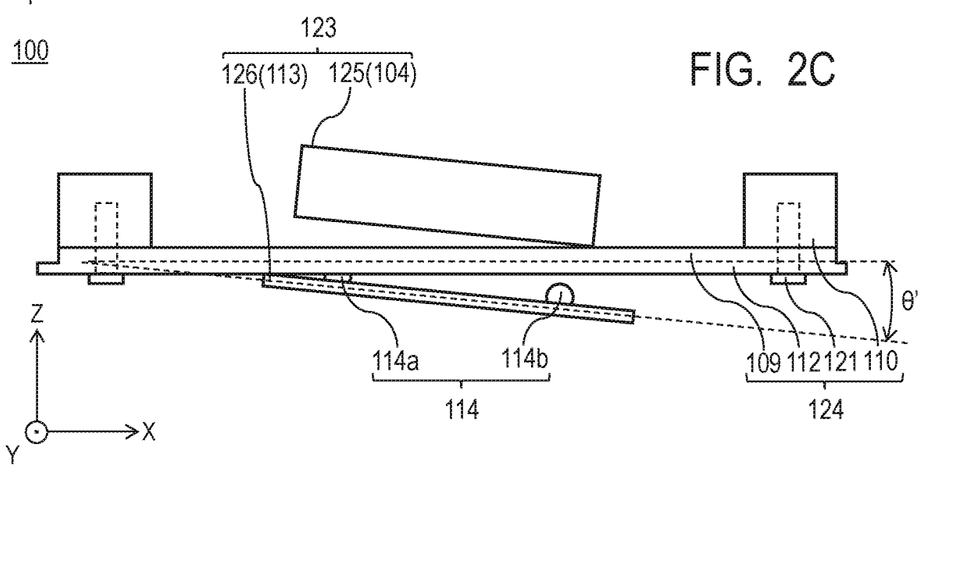
FIG. 2C is a schematic view for illustrating a comparative example.

Next, with reference to FIG. 2A to FIG. 2C, the tilt restriction structure of the vibration wave motor 100, which is the feature of the present disclosure, is described. FIG. 2A is a simple schematic view for illustrating the vibration wave motor 100 according to the present disclosure in a normal state. FIG. 2B is an illustration of a state in which tilt has occurred. FIG. 2C is an illustration of a comparative example in which the first restriction portions 106a and the second restriction portions 113f are not provided.

Here, a mechanism which is configured to hold the vibrator 101 and includes the vibrator holding casing 104 and the second guide member 113 is referred to as "first holding mechanism 123". Further, the vibrator holding casing 104 is referred to as "first vibrator holding member 125" (first holding portion), and the second guide member 113 is referred to as "second vibrator holding member 126" (second holding portion). That is, the first holding mechanism 123 includes the first vibrator holding member 125 and the second vibrator holding member 126 which is longer than the first vibrator holding member 125 in the relative movement direction X. Further, the first vibrator holding member 125 includes the first restriction portions 106a, and the second vibrator holding member 126 includes the second restriction portions 113f. The friction member 109 is arranged between the first vibrator holding member 125 and the second vibrator holding member 126. Further, a mechanism which is configured to hold the friction member 109 and includes the friction-member holding casing 110, the fixing members 121 configured to fix the friction member 109 to the friction-member holding casing 110, and the first guide member 112 is referred to as "second holding mechanism 124".

First, in the normal state as illustrated in FIG. 2A, the first restriction portions 106a and the second restriction portions 113f are arranged apart from the second holding mechanism 124 through a predetermined gap in the Z direction. Here, in a case in which abrupt acceleration or external force is applied when the first holding mechanism 123 performs relative movement with respect to the second holding mechanism 124, the acceleration or external force may overcome the pressurizing force of the pressurizing mechanism 115 to cause tilt of the first holding mechanism 123. On this occasion, when the first holding mechanism 123 tilts at the predetermined angle θ as illustrated in FIG. 2B, the first restriction portion 106a and the second restriction portion 113f are brought into abutment against the second holding mechanism 124 together or individually, thereby restricting the tilt of the vibration wave motor 100. When any of the first restriction portions 106a and the second restriction portions 113f is not provided as illustrated in FIG. 2C, the first holding mechanism 123 tilts at an angle θ' larger than the angle θ. When it is assumed that the first holding mechanism 123 tilts about the first rolling member 114a as a rotation center, the second holding mechanism 124 and the second vibrator holding member 126 sandwiching the second rolling member 114b separate away from each other, with the result that the second rolling member 114b drops off and control cannot be performed. However, in the case of FIG. 2B, the first restriction portion 106a and the second restriction portion 113f are brought into abutment against the second holding mechanism 124 together or individually before the second rolling member 114b drops off, thereby being capable of preventing the second rolling member 114b from dropping off. Further, not limited to the tilt, when the first guide member 112 and the second guide member 113 perform relative movement with respect to each other in parallel, at least one of the first restriction portion 106a and the second restriction portion 113f is brought into abutment against the second holding mechanism 124, thereby being capable of preventing the rolling members 114 from dropping off.

Thus, through the abutment of the first vibrator holding member 125 against the second holding mechanism 124, the first restriction portion 106a acts to restrict the movement in directions other than the direction of the relative movement of the vibrator 101 and the first holding mechanism 123. Further, through the abutment of the second vibrator holding member 126 against the second holding mechanism 124, the second restriction portion 113f acts to restrict the movement in directions other than the direction of the relative movement of the vibrator 101 and the first holding mechanism 123.

The configuration described above has the following features. First, the friction member 109 held on the second holding mechanism 124 is arranged between the first vibrator holding member 125 and the second vibrator holding member 126. Further, the second vibrator holding member 126 includes the second guide member 113 configured to guide the relative movement of the vibrator 101 and the friction member 109, and is arranged on a side opposed to the vibrator 101 and the first vibrator holding member 125 over the friction member 109. Further, the friction-member holding casing 110 is arranged on a side opposed to the second vibrator holding member 126 over the friction member 109. In addition, the second restriction portions 113$f$ are arranged on outer sides with respect to the rolling members 114 in the relative movement direction X.

Figure 3A:
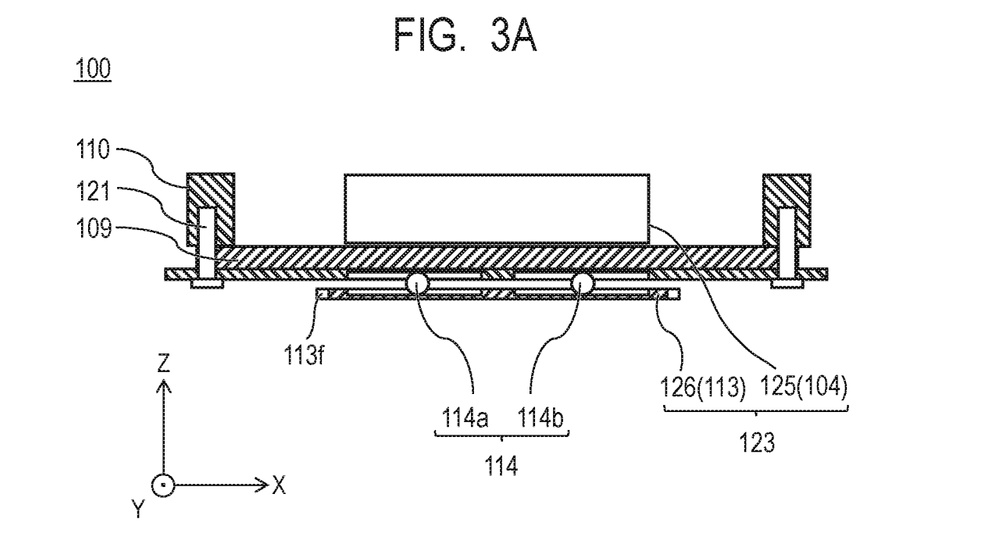
FIG. 3A and FIG. 3B are sectional views for illustrating relative movement in the vibration wave motor (100) according to the first embodiment.
Figure 3B:
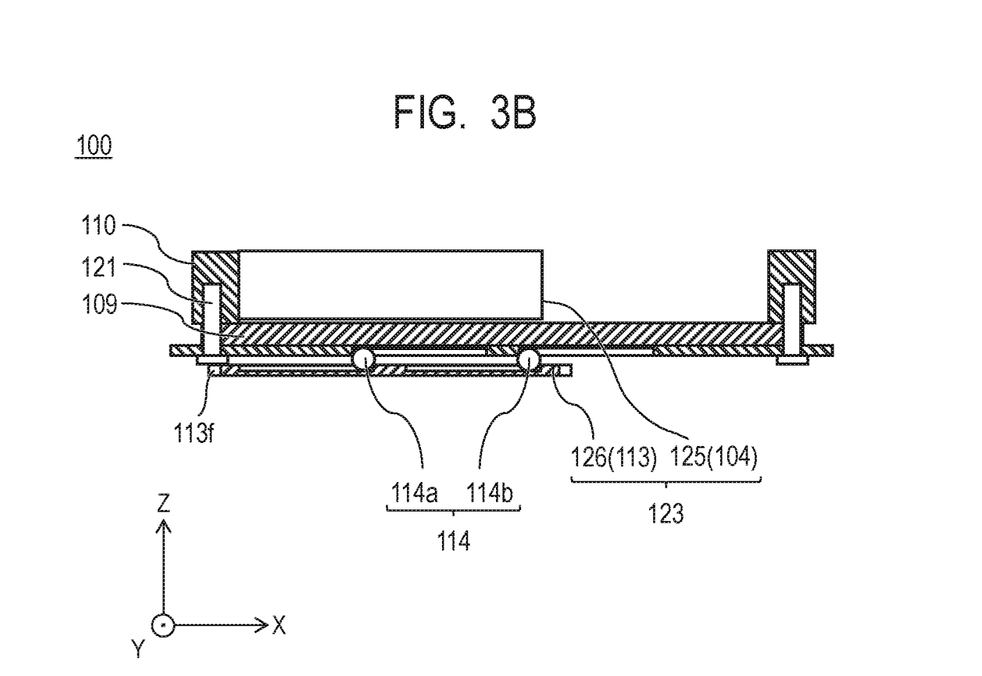

Next, with reference to FIG. 3A and FIG. 3B each being a simple sectional view of the vibration wave motor 100 according to the present disclosure, a range of relative movement of the vibration wave motor 100 is described. FIG. 3A is a sectional view for illustrating a state in which the vibration wave motor 100 is located at a center of the range of relative movement, and FIG. 3B is a sectional view for illustrating a state in which the vibration wave motor 100 is located at an end of the range of relative movement. Further, similarly to FIG. 2A, the mechanism which includes the first vibrator holding member 125 and the second vibrator holding member 126 and is configured to hold the vibrator 101 is referred to as "first holding mechanism 123", and the first vibrator holding member 125 is not illustrated in sectional view.

In FIG. 3A, the first holding mechanism 123 is movable relative to the friction-member holding casing 110, the friction member 109, and the fixing members 121 in the relative movement direction X. On this occasion, the first holding mechanism 123 is movable to a position of abutment against the friction-member holding casing 110 or a position immediately before abutment. The state in which the first holding mechanism 123 has moved to the end of the range of relative movement is illustrated in FIG. 3B. On this occasion, an end portion of the second vibrator holding member 126 (second restriction portion 113$f$) overlaps with the friction-member holding casing 110 and the fixing member 121 in the pressurizing direction Z. With such a configuration, the second vibrator holding member 126 is movable without interference with the friction-member holding casing 110 and the fixing member 121, thereby being capable of achieving an effect of suppressing increase in size of the vibration wave motor 100. Thus, the second vibrator holding member 126 has a feature in that, when the vibrator 101 and the friction member 109 perform relative movement with respect to each other, the second vibrator holding member 126 overlaps with the fixing member 121 and the friction-member holding casing 110 as viewed from the pressurizing direction Z of the pressurizing mechanism 115.

Figure 4:
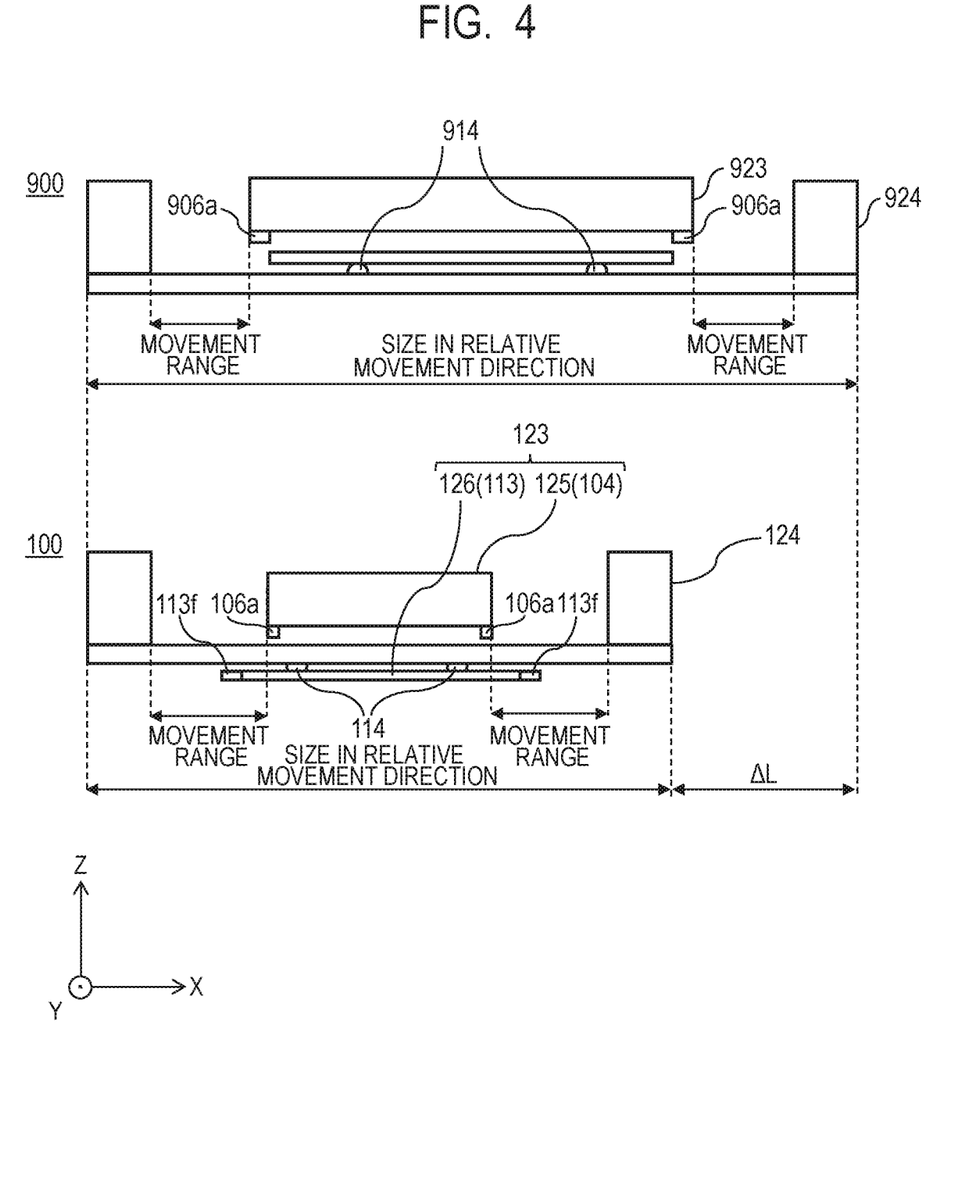
FIG. 4 is a schematic view for illustrating comparison between the vibration wave motor (100) according to the first embodiment and a vibration wave motor (900) of a related art.

Next, an effect of the present disclosure is described. FIG. 4 is a schematic view for illustrating comparison between the vibration wave motor 100 according to the present disclosure and a vibration wave motor 900 of a related art. As illustrated in FIG. 2C, in the case in which any of the first restriction portions 106$a$ and the second restriction portions 113$f$ is not provided, when the first holding mechanism 123 tilts at an angle equal to or larger than the predetermined angle $\theta'$ with respect to the second holding mechanism 124 in the vibration wave motor 100, the second rolling member 114$b$ drops off and control cannot be performed. In view of this, in the vibration wave motor 900 disclosed in Japanese Patent Application Laid-Open No. 2017-22957, restriction portions 906$a$ to be brought into abutment against base portions 924 are provided to a moving portion 923 configured to perform relative movement, thereby restricting tilt within an angle equal to or smaller than the predetermined angle $\theta$. However, with this configuration, it is desired that a movement range of rolling members 914 be covered as much as possible at the time of arranging the restriction portions 906$a$. Therefore, the moving portion 923 to which the restriction portions 906$a$ are provided is increased in size in the relative movement direction X, with the result that the vibration wave motor 900 is increased in size.

As a countermeasure against the problem of the increase in size, in the vibration wave motor 100 according to the present disclosure, the first holding mechanism 123 includes the first vibrator holding member 125 including the first restriction portions 106$a$ and the second vibrator holding member 126 including the second restriction portions 113$f$. Through the abutment of both the first restriction portion 106$a$ and the second restriction portion 113$f$ against the second holding mechanism 124 being a base portion, the tilt of the first holding mechanism 123 performing the relative movement is restricted. In this configuration, a distance between the second restriction portion 113$f$ and the first restriction portion 106$a$ is larger than a distance between the rolling member 114 and the first restriction portion 106$a$. Therefore, even when the size of the first holding mechanism 123 in the relative movement direction X is set smaller, the tilt can be suppressed within the predetermined angle $\theta$. Further, the second vibrator holding member 126 is arranged so as to overlap with the friction-member holding casing 110 at the end of the range of relative movement. Therefore, it is not required that the second holding mechanism 124 be increased in size in the relative movement direction X. Thus, as compared to the vibration wave motor 900 of the related art, the length in the relative movement direction X can be shortened by a length $\Delta L$ while keeping the equivalent range of relative movement.

With the configuration described above, the vibration wave motor 100 capable of being significantly downsized can be provided. The first embodiment is described with the configuration in which the vibrator 101 performs relative movement with respect to the friction member 109. However, the present disclosure is applicable also to a case in which the friction member 109 performs relative movement with respect to the vibrator 101. In such a case, it is only required that the first holding mechanism 123 be fixed to a fixed portion (fixed barrel 5 described later) and a driven member (lens 2 described later) be coupled to the second holding mechanism 124.

Application Example

Figure 5:
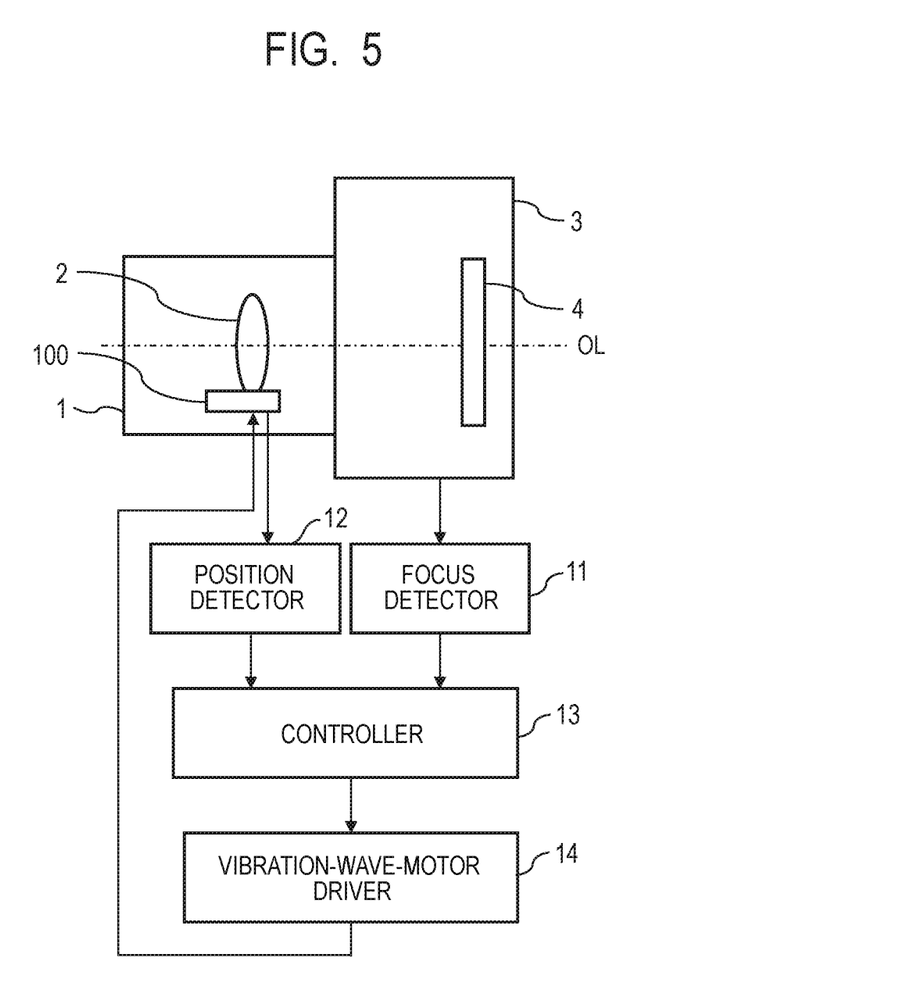
FIG. 5 is a block diagram for illustrating a lens driving device to which the vibration wave motor (100) according to the first embodiment is applied.

Next, a lens driving device in which the vibration wave motor 100 according to the first embodiment of the present disclosure is applied to, for example, a lens barrel of a lens for a digital camera is described. FIG. 5 is a block diagram for illustrating a lens driving device including the vibration wave motor 100 according to the present disclosure. The lens driving device includes a lens barrel 1 and a camera main body 3. The lens barrel 1 includes a lens 2 being a part of an image pickup optical system and the vibration wave motor 100 configured to drive the lens 2. The camera main body 3 includes an image pickup element 4. Further, the lens driving device includes various components illustrated in FIG. 5. A focus state of an image formed on the image pickup element 4 is detected by a focus detector 11, and a signal of the focus state is input to a controller 13. Further, a current position of the lens 2 is detected by a position detector 12, and a signal of the current position is input to the controller 13. Based on those signals, the controller 13 outputs a signal to the vibration-wave-motor driver 14 to drive the vibration wave motor 100. With this, the lens driving device uses the vibration wave motor 100 to move the lens 2 to a target position to correct focus deviation, thereby enabling shooting of a favorable image.

Figure 6:
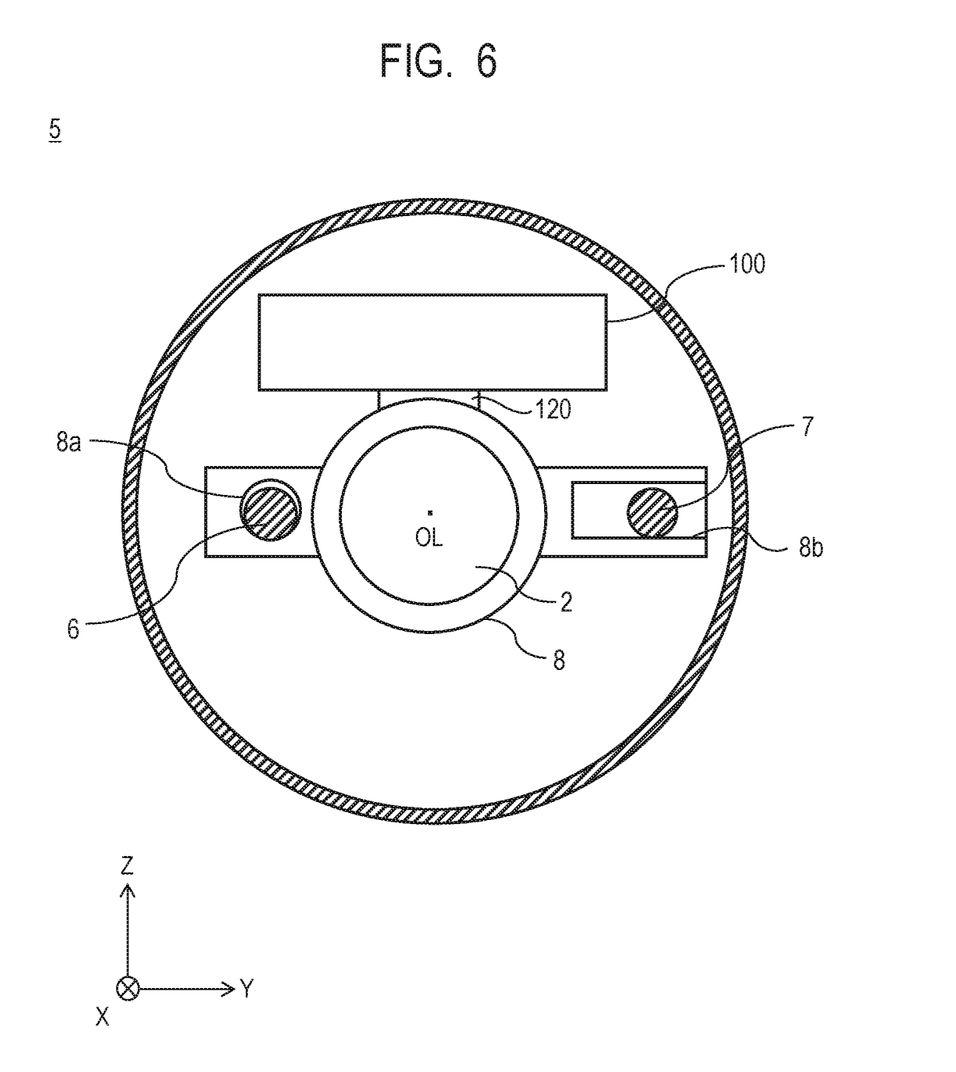
FIG. 6 is a sectional view for illustrating a configuration of a fixed barrel (5) to which the vibration wave motor (100) according to the first embodiment is applied.

Next, a configuration for driving the lens 2 with use of the vibration wave motor 100 is described with reference to FIG. 6. FIG. 6 is a sectional view for illustrating the fixed barrel 5 having the vibration wave motor 100 mounted thereto. The fixed barrel 5 has a substantially cylindrical shape, is held on the lens barrel 1 (not shown), and holds a first lens guide member 6 described later, a second lens guide member 7 described later, and the vibration wave motor 100.

The lens holding member 8 has a substantially cylindrical shape and holds the lens 2 at a center thereof. The lens holding member 8 has a circular hole 8a and a U-shaped groove 8b. The circular hole 8a is formed so as to allow the first lens guide member 6 described later to pass therethrough. The U-shaped groove 8b is formed so as to allow the second lens guide member 7 described later to be held in abutment thereagainst. Further, the lens holding member 8 is coupled to the vibration wave motor 100 through intermediation of the coupling member 120.

The first lens guide member 6 is a main guide bar having a rod-like shape, and is held in abutment against the lens holding member 8 through the circular hole 8a. The first lens guide member 6 restricts parallel movement of the lens holding member 8 in a direction orthogonal to an optical axis direction OL (relative movement direction X). The second lens guide member 7 is a sub guide bar having a rod-like shape, and is held in abutment against the lens holding member 8 through the U-shaped groove 8b. The second lens guide member 7 restricts rotational movement of the lens holding member 8 about the first lens guide member 6. The lens holding member 8 is guided by the first lens guide member 6 and the second lens guide member 7 so as to move in parallel in the optical axis direction OL, thereby performing relative movement with respect to the fixed barrel 5.

With the configuration described above, the thrust force generated by the vibration wave motor 100 is transmitted to the lens holding member 8 by the coupling member 120. Movement of the lens holding member 8 in directions other than the optical axis direction OL is restricted by the first lens guide member 6 and the second lens guide member 7. Thus, the holding member 8 is driven integrally with the lens 2 in the relative movement direction X. Thus, the thrust force generated by the vibrator 101 and the friction member 109 is transmitted to the lens 2 via the coupling member 120, and the lens 2 is driven. Accordingly, focusing can be performed.

Figure 7:
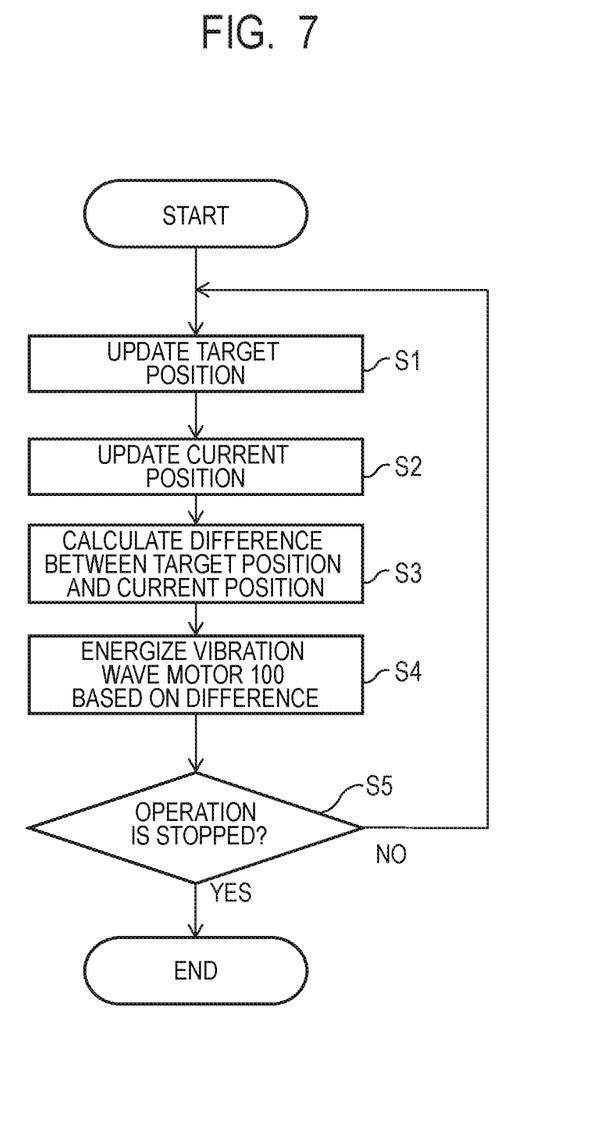
FIG. 7 is a flowchart for illustrating a control sequence for the vibration wave motor (100) according to the first embodiment.

Next, a control method for the vibration wave motor 100 is described with reference to FIG. 7. FIG. 7 is a flowchart for illustrating an operation of the vibration wave motor 100, from start of the focusing operation to stop of the focusing operation.

In Step S1, a focus state of an image formed on the image pickup element 4 is detected by the focus detector 11. A signal of the focus state is input to the controller 13, and a target position to which the vibrator holding casing 104 is to be moved is calculated and updated. In Step S2, a position of the vibrator holding casing 104 is detected by the position detector 12. A signal of the position is input to the controller 13, and a current position is updated. In Step S3, based on a difference between the target position updated in Step S1 and the current position updated in Step S2, energization of the vibration wave motor 100 is determined, and a signal is input to the vibration-wave-motor driver 14. In Step S4, the vibration wave motor 100 is driven based on the input signal, thereby driving the vibrator holding casing 104. In Step S5, determination of whether or not to stop the operation is performed. When determination of stopping the operation is not given, the routine returns to Step S1. Control is continued until the difference between the target position and the current position of the vibrator holding casing 104 is eliminated.

Second Embodiment

Figure 8A:
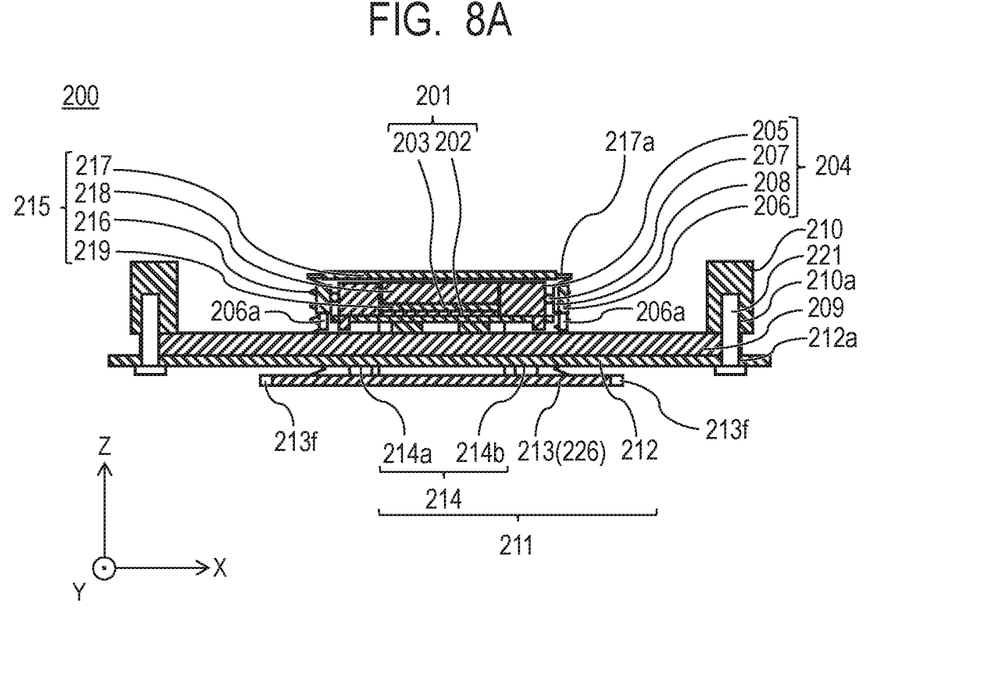
FIG. 8A and FIG. 8B are each a sectional view for illustrating a configuration of a vibration wave motor (200) according to a second embodiment of the present disclosure.
Figure 8B:
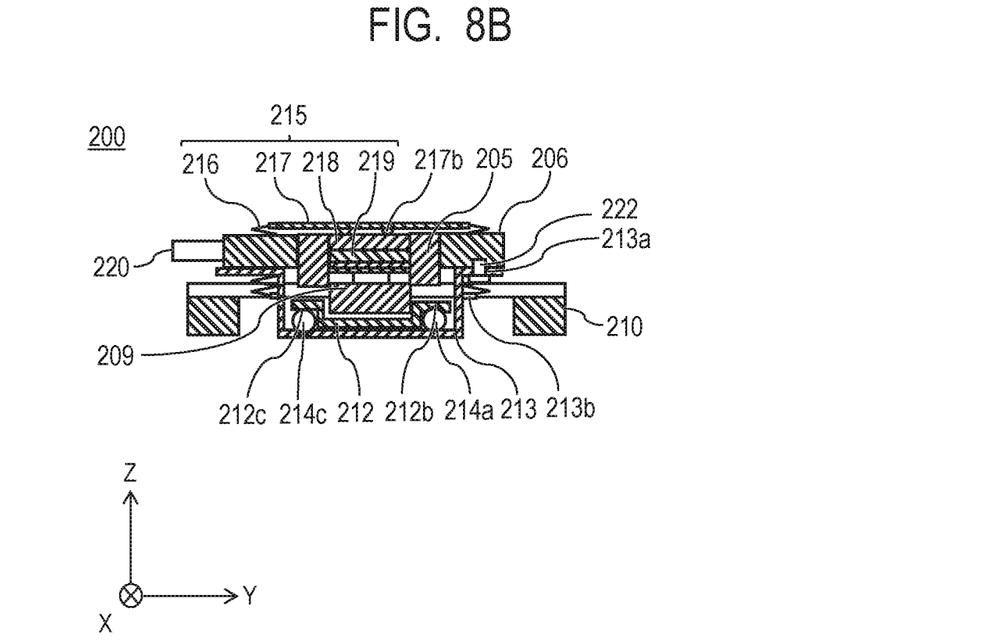

Next, a configuration of a vibration wave motor 200 according to a second embodiment of the present disclosure is described with reference to FIG. 8A and FIG. 8B. FIG. 8A is a sectional view for illustrating the vibration wave motor 200 as viewed from the direction Y orthogonal to the relative movement direction X and the pressurizing direction Z. FIG. 8B is a sectional view for illustrating the vibration wave motor 200 as viewed from the relative movement direction X. Members which are the same as those of the first embodiment are denoted by the same reference symbols, and description thereof is omitted. With regard to members which are different from those of the first embodiment, only different portions are described. Further, a configuration of a lens driving device including the vibration wave motor 200 is the same as that of the first embodiment, and hence description thereof is omitted.

The vibration wave motor 200 includes the vibrator 201, a vibrator holding casing 204, a friction member 209, a friction-member holding casing 210, a guide mechanism 211, a pressurizing mechanism 215, and a coupling member 220. The vibrator 201 (including a vibrating plate 202 and a piezoelectric element 203), the friction member 209, the friction-member holding casing 210, and the coupling member 220 are the same as those of the first embodiment, and hence description thereof is omitted.

The vibrator holding casing 204 includes a first vibrator holding casing 205, a second vibrator holding casing 206, adjustment members 207, and urging members 208, and forms a mechanism configured to hold the vibrator 201. The first vibrator holding casing 205 is the same as that of the first embodiment, and hence description thereof is omitted. The second vibrator holding casing 206 includes first restriction portions 206a, which are brought into abutment against the friction member 209 when the vibrator holding casing 204 tilts at the predetermined angle θ with respect to the friction-member holding casing 210. The adjustment members 207 are members each having a columnar shape. Two adjustment members 207 are arranged in the relative movement direction X so as to be sandwiched between the first vibrator holding casing 205 and the second vibrator holding casing 206. Further, the urging members 208 are members such as plate springs having elasticity, and are configured to urge the first vibrator holding casing 205, the second vibrator holding casing 206, and the adjustment members 207 so as to absorb backlash in the relative movement direction X which may occur thereamong. On this occasion, the adjustment members 207 allow the first vibrator holding casing 205 and the second vibrator holding casing 206 to perform relative movement with respect to each other only in the pressurizing direction Z. With this configuration, even when a state of abutment between the vibrator 201 and the friction member 209 varies depending on the component accuracies of the members, the variation is absorbed through relative movement of the first vibrator holding casing 205 and the second vibrator holding casing 206 in the pressurizing direction Z. As a result, a stable state of abutment is maintained, thereby being capable of generating a thrust force with high efficiency.

The guide mechanism 211 is a mechanism configured to allow the vibrator 201 to perform relative movement with respect to the friction member 209, and includes guide members and rolling members 214. Further, the guide members include a first guide member 212 and a second guide member 213, and the rolling members 214 include a first rolling member 214a, a second rolling member 214b, and a third rolling member 214c.

Figure 9A:
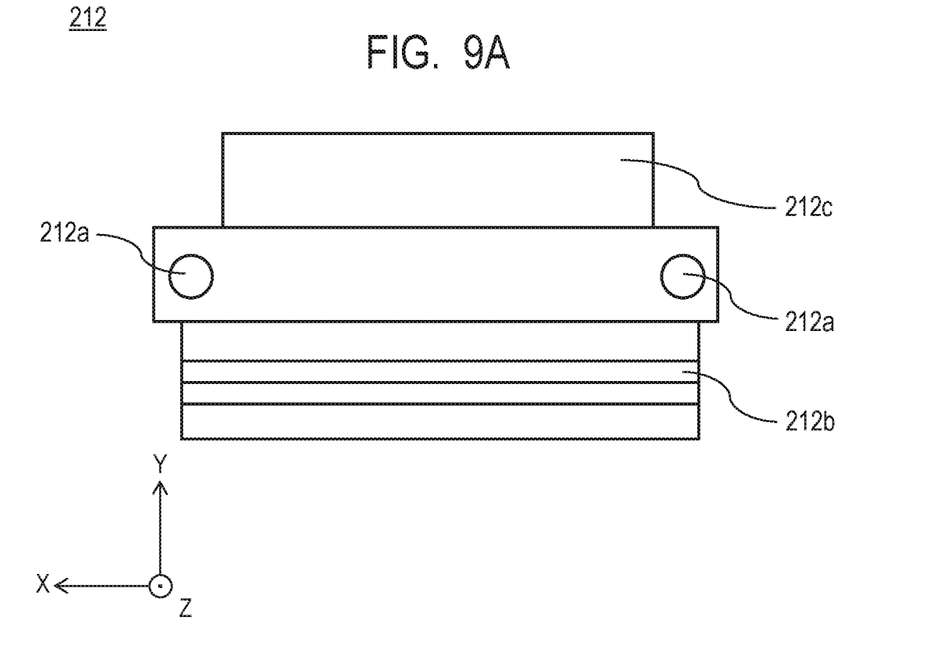
FIG. 9A is a bottom view for illustrating a first guide member (212) in the second embodiment.
Figure 9B:
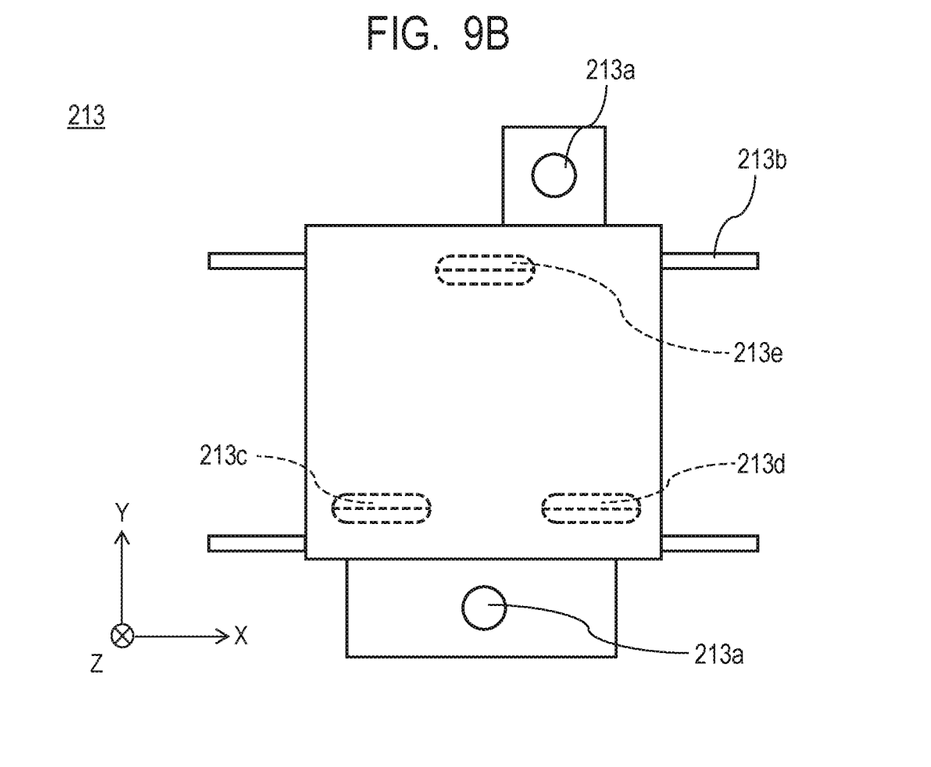
FIG. 9B is a bottom view for illustrating a second guide member (213) in the second embodiment.

FIG. 9A is a bottom view for illustrating the first guide member 212 as viewed from a minus Z direction. FIG. 9B is a bottom view for illustrating the second guide member 213 as viewed from a plus Z direction. The first guide member 212 is a member which is held on the friction-member holding casing 210 and does not perform relative movement with respect to the friction member 209. The first guide member 212 has fastening holes 212a, a V-groove 212b, and a flat-surface portion 212c, and is fastened to the friction-member holding casing 210 by fixing members 221 through the fastening holes 212a. The V-groove 212b is held in abutment against the first rolling member 214a and the second rolling member 214b, and the flat-surface portion 212c is held in abutment against the third rolling member 214c.

The second guide member 213 has fastening holes 213a, and is fastened by fixing members 222 such as screws to the second vibrator holding casing 206, thereby moving integrally with the vibrator holding casing 204. That is, the second guide member 213 is a member which is held on the vibrator holding casing 204 and is configured to move together with the vibrator 201 relative to the friction member 209. Further, the second guide member 213 includes engagement portions 213b engaged with the pressurizing mechanism 215 described later, and is urged in the pressurizing direction Z of the pressurizing mechanism 215. Further, the second guide member 213 has V-grooves 213c, 213d, and 213e which are brought into abutment against the first rolling member 214a, the second rolling member 214b, and the third rolling member 214c respectively. Further, the second guide member 213 includes second restriction portions 213f, which are brought into abutment against the first guide member 212 when the vibrator holding casing 204 tilts at the predetermined angle θ with respect to the friction-member holding casing 210. However, the second restriction portions 213f are not limited to structures. Also when the second guide member 213 has regions to be brought into abutment against the first guide member 212, the second guide member 213 is regarded as including second restriction portions 213f. Further, the second restriction portions 213f are arranged in a region wider in the relative movement direction X than a region in which the first rolling member 214a, the second rolling member 214b, and the third rolling member 214c are arranged. One of the features of the present disclosure is that the second guide member 213 is longer than the vibrator holding casing 204 in the relative movement direction X.

The first rolling member 214a, the second rolling member 214b, and the third rolling member 214c are each a spherical member. The first rolling member 214a is sandwiched between the V-groove 212b of the first guide member 212 and the V-groove 213c of the second guide member 213, and the second rolling member 214b is sandwiched between the V-groove 212b of the first guide member 212 and the V-groove 213d of the second guide member 213. Further, the third rolling member 214c is sandwiched between the flat-surface portion 212c of the first guide member 212 and the V-groove 213e of the second guide member 213. With this configuration, the first rolling member 214a, the second rolling member 214b, and the third rolling member 214c are restricted by the first guide member 212 so as to move only in the relative movement direction X, and the second guide member 213 is also similarly restricted so as to move only in the relative movement direction X. Further, the rolling members 214 roll to allow the second guide member 213 to move with low friction. The second embodiment is different from the first embodiment on the following point. Specifically, with the additional third rolling member 214c, relative rotation of the first guide member 212 and the second guide member 213 is restricted, and hence a member for stopping the rotation is not required. With the configuration described above, the second guide member 213 is guided in the relative movement direction X with respect to the first guide member 212, and hence the vibrator holding casing 204 is guided in the relative movement direction X with respect to the friction-member holding casing 210.

The pressurizing mechanism 215 is a pressurizing portion which includes elastic members 216, a first transmission member 217, a second transmission member 218, and a third transmission member 219 and is configured to pressurize the vibrator 201 against the friction member 209. The elastic members 216 are the same as those of the first embodiment, and hence description thereof is omitted. The first transmission member 217 is a member which includes holding portions 217a configured to hold the elastic members 216 and is configured to transmit a pressurizing force to the second transmission member 218. Further, the first transmission member 217 includes protrusions 217b and is held in abutment against the second transmission member 218 with the protrusions 217b. The second transmission member 218 is held in abutment against the first transmission member 217 to transmit the pressurizing force to the third transmission member 219. With the protrusions 217b held in abutment against the second transmission member 218, the pressurizing force can be transmitted with high efficiency even when the orientation of abutment varies depending on manufacture variation. The third transmission member 219 and an overall configuration thereof are the same as those of the first embodiment, and hence description thereof is omitted. With the configuration described above, the pressurizing force of the elastic members 216 is transmitted with high efficiency via the first transmission member 217, the second transmission member 218, and the third transmission member 219, thereby holding the vibrator 201 in friction contact with the friction member 209.

With the configuration described above, in the vibration wave motor 200, the thrust force is generated between the vibrator 201 and the friction member 209 by voltage applied through the power-feeding member (not shown), thereby causing the vibrator holding casing 204 configured to hold the vibrator 201 to perform relative movement with respect to the friction-member holding casing 210. Further, the thrust force is transmitted to a driven member via the coupling member 220, thereby driving the driven member in the relative movement direction X.

Figure 10A:
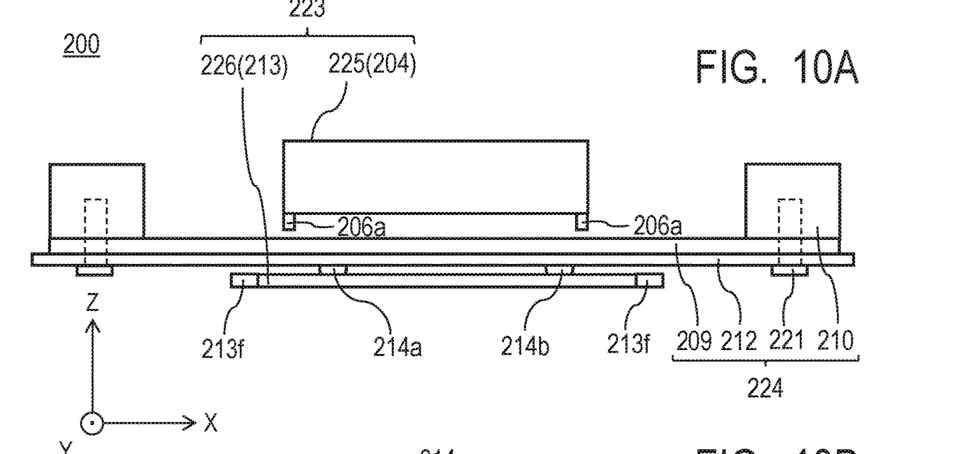
FIG. 10A, FIG. 10B and FIG. 10C are each a schematic view for illustrating a tilt restriction structure of the vibration wave motor (200) according to the second embodiment.
Figure 10B:
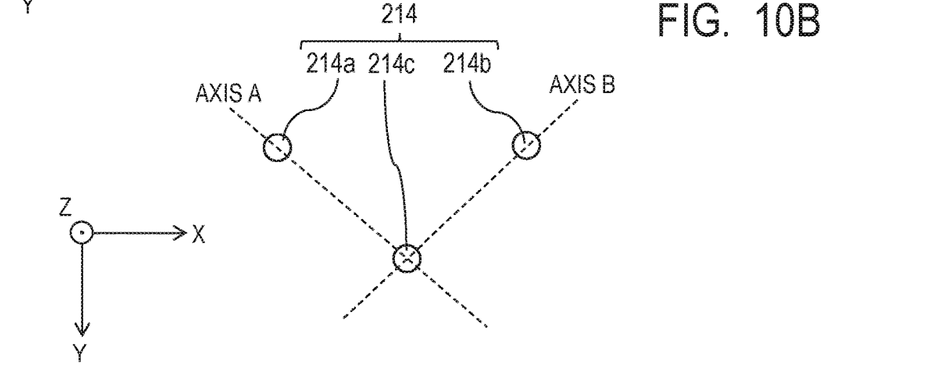
Figure 10C:
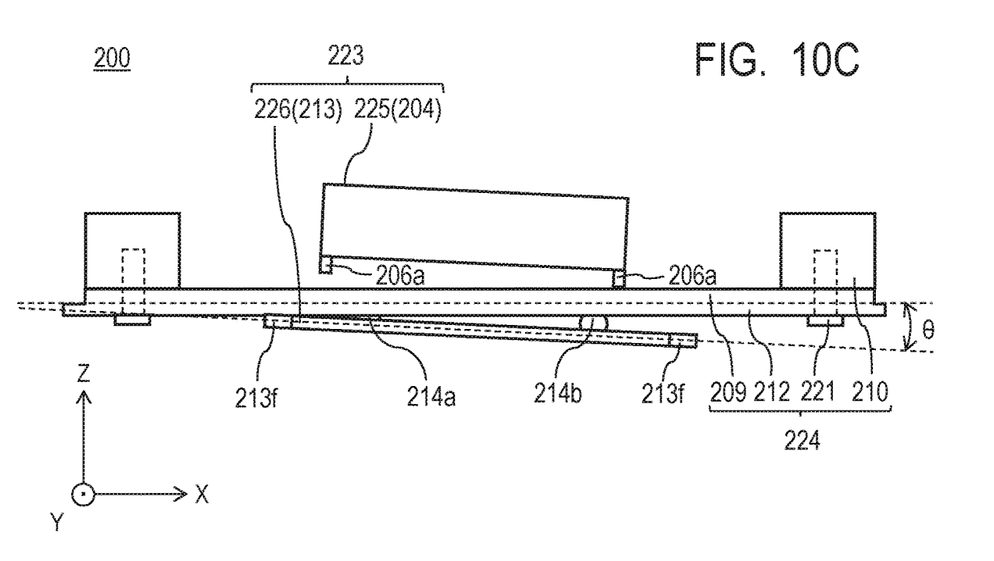

Next, with reference to FIG. 10A to FIG. 10C, the tilt restriction structure of the vibration wave motor 200, which is the feature of the present disclosure, is described. FIG. 10A is a simple schematic view for illustrating the vibration wave motor 200 according to the present disclosure in a normal state. FIG. 10B is a plan view for illustrating the rolling members 214 of the vibration wave motor 200 as viewed from the plus Z direction. FIG. 10C is an illustration of a state in which tilt has occurred in the vibration wave motor 200.

Here, similarly to the first embodiment, a mechanism which is configured to hold the vibrator 201 and includes the vibrator holding casing 204 and the second guide member 213 is referred to as "first holding mechanism 223". Further, the vibrator holding casing 204 is referred to as "first vibrator holding member 225" (first holding portion), and the second guide member 213 is referred to as "second vibrator holding member 226" (second holding portion). That is, the first holding mechanism 223 includes the first vibrator holding member 225 and the second vibrator holding member 226 which is longer than the first vibrator holding member 225 in the relative movement direction X. Further, the first vibrator holding member 225 includes the first restriction portions 206a, and the second vibrator holding member 226 includes the second restriction portions 213f. The friction member 209 is arranged between the first vibrator holding member 225 and the second vibrator holding member 226. Further, a mechanism which is configured to hold the friction member 209 and includes the friction-member holding casing 210, the fixing members 221 configured to fix the friction member 209 to the friction-member holding casing 210, and the first guide member 212 is referred to as "second holding mechanism 224".

First, in the normal state as illustrated in FIG. 10A, the first restriction portions 206a and the second restriction portions 213f are arranged apart from the second holding mechanism 224 through a predetermined gap in the Z direction. Here, in a case in which abrupt acceleration or external force is applied when the first holding mechanism 223 performs relative movement with respect to the second holding mechanism 224, the acceleration or external force may overcome the pressurizing force of the pressurizing mechanism 215 to cause tilt of the first holding mechanism 223. On this occasion, an axis of the tilt corresponds to, as illustrated in FIG. 10B, an axis A connecting the first rolling member 214a and the third rolling member 214c to each other or an axis B connecting the second rolling member 214b and the third rolling member 214c to each other. When the first vibrator holding member 225 has relatively moved in the plus X direction, the tilt about the axis B is liable to occur. When the first vibrator holding member 225 has relatively moved in the minus X direction, the tilt about the axis A is liable to occur. When the first holding mechanism 223 tilts at the predetermined angle θ about the axis A or the axis B as a rotation center as illustrated in FIG. 10C, the first restriction portion 206a and the second restriction portion 213f are brought into abutment against the second holding mechanism 224 together or individually, thereby restricting the tilt in the vibration wave motor 200. When any of the first restriction portions 206a and the second restriction portions 13f is not provided, the first holding mechanism 223 tilts at an angle θ' larger than the angle θ similarly to FIG. 2C and control cannot be performed. However, in the case of FIG. 10C, the first restriction portion 206a and the second restriction portion 213f are brought into abutment against the second holding mechanism 224 together or individually before any the rolling members 214 drops off, thereby being capable of preventing the rolling members 214 from dropping off. Further, similarly to the first embodiment, not limited to the tilt, when the first guide member 212 and the second guide member 213 perform relative movement with respect to each other in parallel, at least one of the first restriction portion 206a and the second restriction portion 213f is brought into abutment against the second holding mechanism 224, thereby being capable of preventing the rolling members 214 from dropping off.

Thus, through the abutment of the first vibrator holding member 225 against the second holding mechanism 224, the first restriction portion 206a acts to restrict the movement in directions other than the direction of the relative movement of the vibrator 201 and the first holding mechanism 223. Further, through the abutment of the second vibrator holding member 226 against the second holding mechanism 224, the second restriction portion 213f acts to restrict the movement in directions other than the direction of the relative movement of the vibrator 201 and the first holding mechanism 223.

A mechanism configured to drive the lens 2 through use of the vibration wave motor 200 and a control method for the vibration wave motor 200 are the same as those of the first embodiment, and hence description thereof is omitted. Further, an effect attained in the second embodiment is the same as that of the first embodiment, and hence description thereof is omitted.

With the configuration described above, the vibration wave motor 200 capable of being significantly downsized as compared to the related art can be provided. Similarly to the first embodiment, the second embodiment is described with the configuration in which the vibrator 201 performs relative movement with respect to the friction member 209. However, the present disclosure is applicable also to a case in which the friction member 209 performs relative movement with respect to the vibrator 201.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-188042, filed Oct. 3, 2018, which is hereby incorporated by reference herein in its entirety.

What is claimed is:

1. A vibration wave motor comprising:
a vibrator;
a friction member held in friction contact with the vibrator;
a pressurizing mechanism configured to pressurize the vibrator against the friction member;
a first holding mechanism configured to hold the vibrator; and
a second holding mechanism configured to hold the friction member,
wherein the vibrator and the friction member are configured to perform relative movement with respect to each other,
wherein the first holding mechanism includes a first holding portion and a second holding portion which is longer than the first holding portion in a direction of the relative movement,
wherein the friction member is arranged between the first holding portion and the second holding portion,
wherein the first holding portion includes a first restriction portion, wherein the second holding portion includes a second restriction portion, and wherein the first restriction portion and the second restriction portion are brought into abutment against the second holding mechanism to restrict movement in directions other than the direction of the relative movement of the vibrator and the first holding mechanism.

2. The vibration wave motor according to claim 1, wherein the second holding portion comprises a guide portion, which is configured to guide the relative movement, and is arranged on a side opposed to the vibrator and the first holding portion over the friction member.

3. The vibration wave motor according to claim 2,
wherein the guide portion comprises a guide member and a rolling member, and
wherein the second restriction portion is arranged on an outer side with respect to the rolling member in the direction of the relative movement.

4. The vibration wave motor according to claim 1, wherein the second holding mechanism comprises:
a holding casing configured to hold the friction member; and
a fixing member configured to fix the friction member to the holding casing, and
wherein the holding casing is arranged on a side opposed to the second holding portion over the friction member.

5. The vibration wave motor according to claim 4, wherein, when the vibrator and the friction member perform the relative movement with respect to each other, the second holding portion overlaps with the fixing member and the holding casing as viewed from the pressurizing direction of the pressurizing mechanism.

6. The vibration wave motor according to claim 1, wherein the vibration wave motor comprises an ultrasonic motor configured to generate vibration with a frequency in an ultrasonic range.

7. A lens driving device comprising a vibration wave motor, the vibration wave motor including:
a vibrator;
a friction member held in friction contact with the vibrator;
a pressurizing mechanism configured to pressurize the vibrator against the friction member;
a first holding mechanism configured to hold the vibrator; and
a second holding mechanism configured to hold the friction member,
wherein the vibrator and the friction member are configured to perform relative movement with respect to each other,
wherein the first holding mechanism includes a first holding portion and a second holding portion which is longer than the first holding portion in a direction of the relative movement,
wherein the friction member is arranged between the first holding portion and the second holding portion,
wherein the first holding portion includes a first restriction portion,
wherein the second holding portion includes a second restriction portion, and
wherein the first restriction portion and the second restriction portion are brought into abutment against the second holding mechanism to restrict movement in directions other than the direction of the relative movement of the vibrator and the first holding mechanism.

* * * * *